Oct. 13, 1942.  P. L. PHILLIPS  2,298,586
OPTICAL APPARATUS
Filed May 20, 1939     3 Sheets-Sheet 1
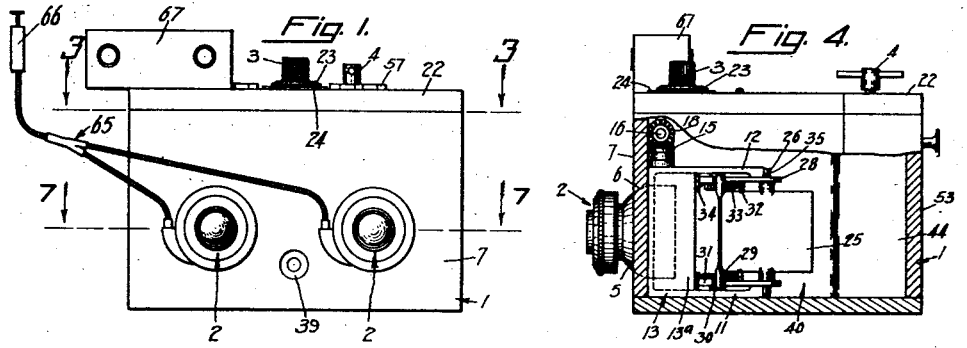
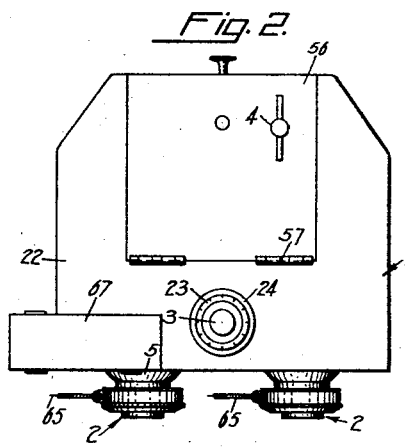
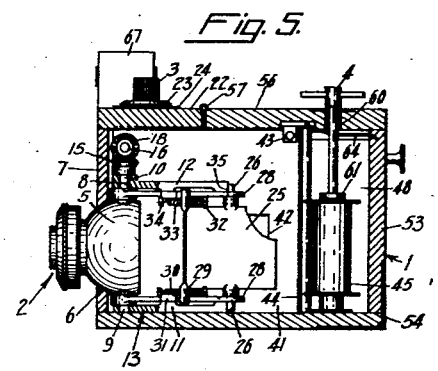
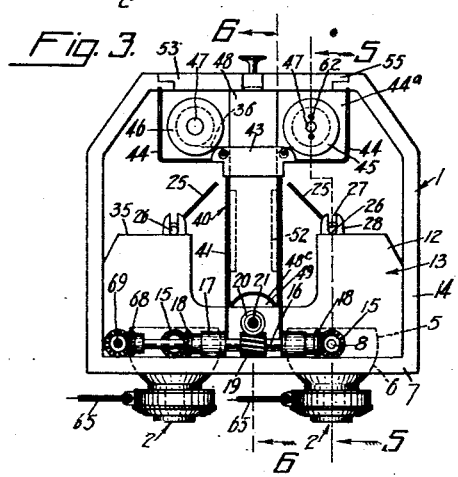
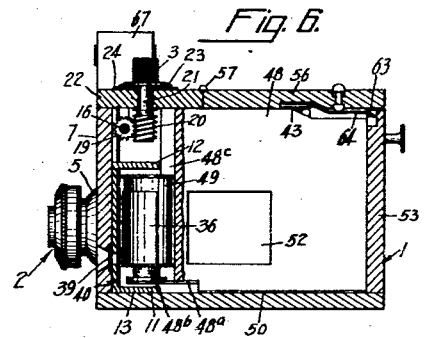
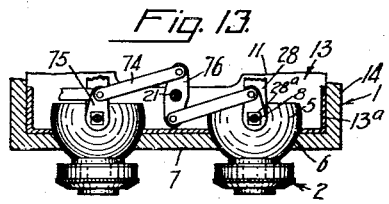
INVENTOR
Paul L. Phillips
By
ATTORNEY

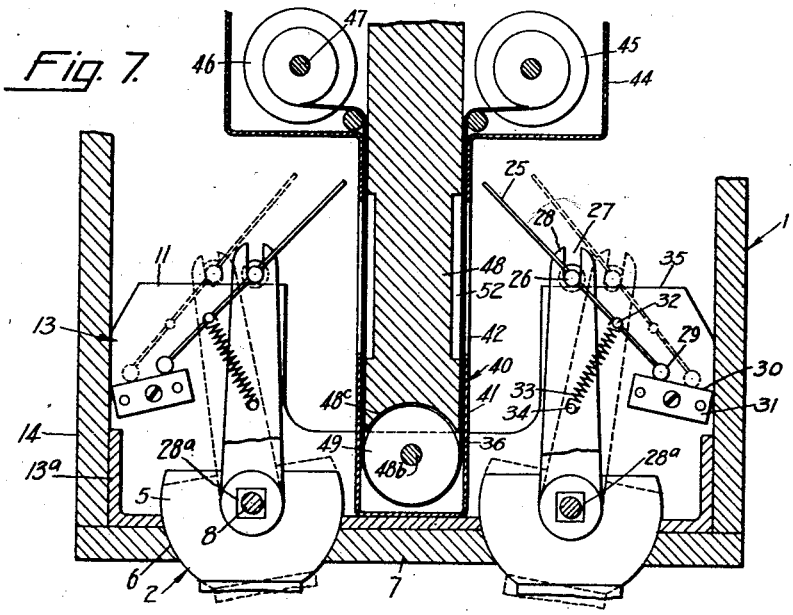

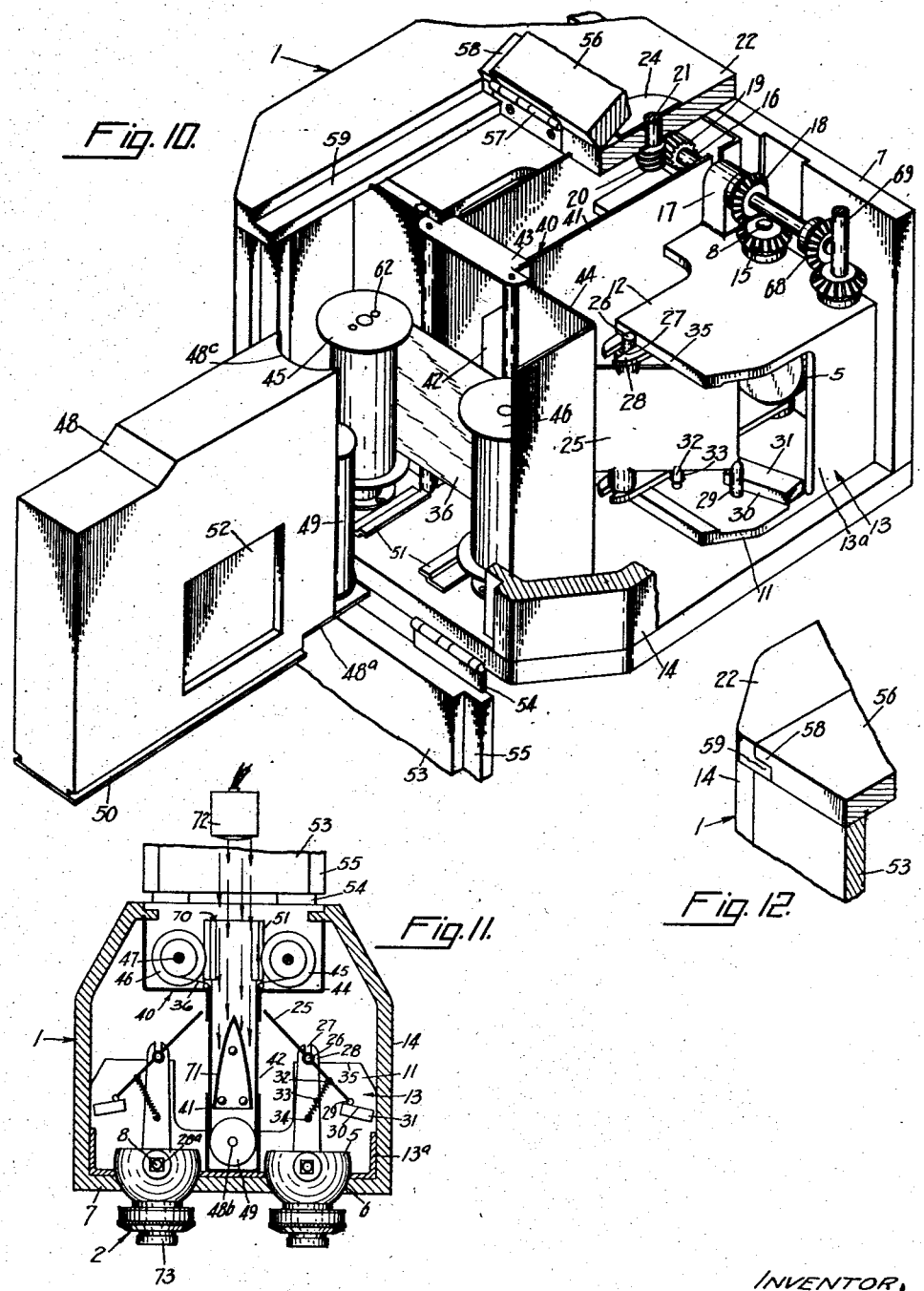

Patented Oct. 13, 1942

2,298,586

UNITED STATES PATENT OFFICE 2,298,586

OPTICAL APPARATUS

Paul L. Phillips, Hartford, Conn.

Application May 20, 1939, Serial No. 274,799

18 Claims. (Cl. 95—18)

My invention relates to optical apparatus.

It has among its objects to provide an improved optical apparatus and more particularly one having adjustable converging lenses and improved means whereby it is made possible to produce true stereoscopic images without blurring of outline or haziness or distortion due to displacement of the images as the lenses converge. A further object is to provide improved focusing means for such a stereoscopic optical apparatus wherein by an improved adjustment of the reflecting surfaces relative to the converging lenses and one another, it is made possible to correct or compensate for the displacement of the images caused by converging the lenses. Another object is to provide such improved means wherein improved pivoted reflecting surfaces are moved both angularly relative to the lenses bodily laterally relative to one another in such manner, for example, in a camera to maintain the central rays from the lenses perpendicular to the film in all positions of the lenses, while also maintaining the film and its carrier or guides and the apertures in a constant position relative to the camera. Still another object is to provide such an improved mechanism wherein the angles of lens convergence and of adjustment of the reflecting surfaces bear a direct relationship to one another, one being a function of the other, and wherein the above adjustments are further calibrated to each other and simultaneously effected from a single controlling mechanism. A still further object is to provide such an improved mechanism wherein the focal length also bears a like direct relationship to the angle of lens convergence and is automatically varied when the above adjustments are made; all in such manner that separate racking of the lenses is eliminated, and that the angles of the lenses and the positions of the reflecting surfaces are automatically adjusted by the same controlling mechanism, here calibrated to accord with the distance of the object to be photographed from the camera. Still further objects of my invention are to provide an improved location and arrangement of the film relative to the lens systems, whereby the above advantages are obtained, including improved means for mounting and feeding the film in the camera between the converging lens systems, whereby right and left exposures are simultaneously obtained and in such an improved manner as to produce markedly improved results. Another object of my invention is the provision of improved film carrying and spacing mechanism, herein including improved film guiding means and a removable spacing block, all whereby the film may be readily inserted in operative position and moved relative to its spools between exposures, while also being readily removed when desired. Still another object of my invention is to provide such an improved camera wherein the same improved lens system utilized in taking the photographs, can also be utilized in projecting the same, and wherein an improved projector unit may be readily substituted for the spacing block. A still further object of my invention is to provide an improved film adapted to use with either my improved camera or improved projector mechanisms and wherein, while utilizing a continuous strip, the image spaces or sections on the film are so arranged on the strip and relative to one another as to be adapted to cooperate with the lens systems on opposite sides of the camera in taking or projecting right and left pictures from different lens systems in an improved manner. These and other objects and advantages of my improvements will, however, hereinafter more fully appear.

In the accompanying drawings, I have shown for purposes of illustration one embodiment which my invention may assume in practice.

In these drawings:

Figure 1 is a front elevation of a still camera constructed in accordance with my improvements;

Fig. 2 is a top plan view of the same;

Fig. 3 is a plan view of the construction shown in Figure 2 with the cover removed, the view being taken substantially on line 3—3 of Figure 1;

Fig. 4 is a side elevation of Figure 1, the casing being broken away;

Fig. 5 is a section on line 5—5 of Figure 3;

Fig. 6 is a section on line 6—6 of Figure 3;

Fig. 7 is an enlarged partial horizontal sectional view substantially on line 7—7 of Figure 1 showing the lenses in elevation and the lens system in different positions of adjustment in full and dotted lines;

Fig. 8 is a diagrammatic view of the lens systems in various positions of adjustment;

Fig. 9 is a plan view of a strip of film;

Fig. 10 is a perspective view of the rear end of the camera, showing the same in process of loading or removing the film;

Fig. 11 is a reduced sectional view similar to Figure 7, but showing the camera functioning as a projector;

Fig. 12 is a detail of the frame, and

Fig. 13 is a plan view of a modified form of lens adjusting mechanism.

In this illustrative construction, the camera is carried in a suitable casing 1, and has suitable spaced lenses, generally indicated at 2, and matched for stereoscopic work, and projecting from the front face of the casing and controlled by a suitably calibrated adjusting member 3 on the top of the casing, while the improved film is controlled by a suitable film feeding member 4, likewise on the top of the casing and in rear of the member 3; improved lens system adjusting mechanism and improved film locating and guiding mechanism being provided within the casing and operated upon operation of these members 3 and 4, as hereinafter more fully described.

Referring first to the lens system, it will be noted that the supporting structures for the lenses 2 are provided on their inner ends with substantially semi-spherical housing portions 5. These in turn, are received in correspondingly curved sockets 6 in the front wall 7 of the casing 1 in such manner as to permit free angular movement of the portions 5, while preventing entrance of light around the latter. As shown, each of the portions 5 has an upright journal member 8 carried on the top and bottom thereof and journalled at 9 and 10 in the bottom and top members 11 and 12 of a frame, generally indicated at 13, and herein fitting against the inside face of the casing front 7 and having side portions 13a engaging the side walls 14 of the casing. Further, it will be noted that each of these journal members 8 herein has a bevelled pinion 15 fixed to its upper end, and that a transverse shaft 16, herein suitably journalled on spaced upstanding bosses 17 on the top 12 of the frame 13, has longitudinally spaced bevelled pinions 18 thereon meshing with these pinions 15. Further, it will be observed that between the bosses 17 the shaft 16 carries a worm gear 19 which meshes with a worm 20 carried on a vertical shaft 21 projecting through and journalled in the top 22 of the casing 1 and rotatable by the adjusting member 3. Suitable calibrations being provided on a flange 23 on the member 3 and on a plate 24 seated below this flange on the casing top 22, it will be evident that the member 3 may be operated as desired to change the angle of convergence of the lenses 2 in accordance with the distance therefrom of the object to be photographed, both lenses 2 then moving together into or out of converging relation about their journal members 8.

Cooperating with the lenses 2 is improved reflecting mechanism adapted automatically to be adjusted as the convergence of the lenses 2 is varied. As shown, this mechanism includes vertically disposed reflectors 25 disposed in the path of the rays entering through the lenses 2, these reflectors herein being suitably journalled in the casing 1 and disposed between the top and bottom portions 11 and 12 of the frame 13. These reflectors 25 may obviously be of various glass or metal types but herein are in the form of metal plates of suitable thickness and having polished surfaces on the faces thereof adjacent the lenses. As illustrated, these plates are duplicates and disposed at the same angle on opposite sides of the center line of the casing. Herein, their front ends diverge and their rear ends converge, and both plates are so operated that they will move together through equal angles whenever the member 3 is operated to change the angle of convergence of the lenses 2. Herein, each plate is provided midway between its ends with journals 26 at its top and bottom, and these journals project vertically through rearwardly extending slots 27 in rearwardly extending arms 28. These arms 28, in turn, are fixed to the journal members 8 of the lenses above and below the portions 5 on the latter and between said portions and the bottom and top portions 11 and 12 of the frame 13, a squared portion 28a being provided on the members 8 to insure angular movement of the arms with the lenses. Further, it will be observed that the front or diverging end of each plate has upwardly and downwardly projecting journals 29 each of which engages an almost inappreciably curved ground surface 30 on abutments 31 which are carried on the bottom and top members 11 and 12 of the frame 13 and extend transversely thereto at an angle, as illustrated in Figures 7 and 10. Further, it will be observed that a depending projection 32 is provided on the bottom and top of each plate 25 between the journal 29 and the journal 26 thereon, and that a coiled spring 33 is connected between this projection 32 and a pin 34 carried on the arms 28, herein on the longitudinal center line of said arms and slightly nearer the journal member 8. Moreover, each of the journals 26 herein engages a transversely disposed ground edge 35 on the adjacent top or bottom portion 11 or 12 of the frame 13, while this journal 26 is free to move longitudinally in its slot 27 in the arm 28 which rotates with the journal member 8. Consequently, when, through operation of the member 3, the lenses 2 are moved about their journal members 8 to change the angle of convergence of these lenses, the arms 28 will be moved therewith in such manner as simultaneously to change the angle of the reflector plates 25. Moreover, during this movement, the journals 26 on the latter plates will move along the ground edges 35 of the frame portions 11 and 12 as the slots 27 move relative to these journals, while the journals 29 on the plates 25 will also move along the ground surfaces 30 on the members 31, both movements being effected while the springs 33 tend to retain the journals 26 and 29 in contact with their respective ground surfaces. Thus, obviously, when the convergence of the lenses 2 is changed, the plates 25 will be moved therewith from, for example, the full line position shown in Figure 7 to the dotted line position shown therein, or to any intermediate position, the angular movement of the plates 25 being controlled by the contact of the journals 26 and 29 with the ground edges 30 and 35. Obviously, if desired, suitable anti-friction rollers may be provided on the journals 26 and 29.

In Figure 8, to facilitate illustration, only the central rays of both lenses 2 have been diagrammatically shown, simple meniscus lenses being illustrated. From this figure, it will be evident that as a result of my improved construction, in all positions of the lenses 2, the central rays passing through both lenses 2 will be controlled in an improved manner. More particularly, as the lenses 2 converge or diverge, the reflectors 25 will not only be moved therewith, but angularly relative thereto through an angle of one-half as many degrees as that through which the lenses are moved, while these reflectors also move laterally along the edges 30 and 35. Thus, as the lenses are adjusted, each reflector 25 is also adjusted both angularly and bodily or translatively relative to its own lens, in such manner as thereby automatically to correct or compensate for the displacement of its image due to the adjustment of the lens. Further, it will be apparent that as a result of the coordinated movements of the parts, in all positions of the lenses 2 and deflectors 25 the central rays passing through the lenses will be reflected from the reflectors 25 at the same angle to the latter at which the central rays passed to the reflector. Also, it will be evident that these central rays will thus be reflected in the same transverse vertical plane and that all of the other rays passing through the lenses will thus be maintained, when reflected, in proper relation to these central rays in such manner as to enable them in all lens positions to form an undistorted image, since they are directed at the proper angles to oppositely disposed parallel vertical surfaces, disposed longitudinally of the camera casing midway between the sides thereof, to avoid distortion. Obviously, any suitable type of lens may be used depending upon the speed required.

Cooperating with my improved adjusting mechanism is an improved film adapted to be disposed in longitudinally extending vertical relation between the right and left lens systems and at right angles to the central rays projected from both reflectors 25. Referring to Figure 9, it will be noted that I have shown a strip of film 36 having the exposure sections 37 thereof of greater length than width, and of such dimensions as to receive the full image transmitted through the lenses 2 when this strip is disposed transversely with respect to the right and left lens systems and between the latter, as shown in Figure 7. Further, it will be noted that these sections 37 are spaced from each other by narrow intermediate sections 38, and that the strip is also provided with blank marginal portions on opposite longitudinal edges thereof. Further, numerals 1, 2 etc., are herein shown as provided on the bottom marginal portion, in such manner that when the film is fed through the camera, these numerals will be visible through a usual red viewing aperture 39 in the front face 7 of the casing to facilitate adjustment of the film. While I have shown this strip as containing twelve exposure sections, the strip may be of any desired length. Further, while I have shown only the working part of the film, it will be understood that the film is otherwise of any suitable standard type adapted to be spoolwound in a usual manner.

Cooperating with my improved film and adapted to dispose the same in operative relation between the lens systems, as shown in Figure 7, and to facilitate insertion or removal thereof, is improved film mounting and guiding mechanism. Herein this mechanism includes an elongated, rectangular, hollow frame, generally indicated at 40, having opposite spaced side portions 41 provided with suitable registering apertures 42. These apertures are adapted to receive the images reflected from the reflectors 25 and are disposed at right angles to the paths of the central rays reflected from these reflectors, while these apertures are also of substantially the same size as the film sections 37. Herein, this frame 40 is suitably fixed inside the casing 1 and has a closed front end abutting the inside face of the frame 13, while it also has the shaft 15 extending through slots in the top of the side members 41 thereof, and it is further slotted to receive the top 12 of the frame 13. As shown, the rear ends of the side portions 41 are also connected to the bottom of the casing 1 by a connecting frame 43, while laterally and then rearwardly extending extensions 44 are provided on these portions 41 to form a suitable film spool chamber 44a at the rear of casing 1. In this chamber, the spools 45 and 46 for the film strip 36 are disposed in spaced vertical relation on opposite sides of the rear open end of the frame 40, these spools, for example, being mounted on upstanding film supporting spindles 47 carried on the bottom of the chamber 44a. Cooperating with the film carried on these spools and extending between the latter is an improved film block 48, herein having a front bottom projection 48a carrying a spindle 48b for an idler spool 49 rotatably mounted in vertical position on its front edge and rotatable in an arcuate cut away portion 48c in that edge. This block herein substantially fills the space between the walls 41 of the frame 40 and has a slide portion 50 on its bottom adapted to cooperate with cooperating slide portions 51 on the bottom of the spool chamber. Further, it will be observed that the block has a suitable shallow cut-out portion 52 on each side thereof, generally conforming to the aperture 42, these cut-out portions being of slightly greater size than these apertures and adapted to be disposed in rear thereof when the film strip 36 and the block 48 are in their operative positions shown in Figure 7. Further, it will be evident that with this construction, the film strip 36 will be carried into this position by the insertion of the block 48 longitudinally to the right from the position shown in Figure 10. Obviously, the block may be similarly withdrawn longitudinally to permit the insertion of a new film.

Attention further is directed to the fact that when two film sections 37 are in registry behind the apertures 42 in the frame portions 41, two intermediate film sections are disposed between these film sections and extend from the front edges thereof around the film idler spool 49. Thus, referring to the film strip 36 shown in Figure 9, it will be evident that the film sections 37 which for identification herein bear the central numerals 1 and 4 will be simultaneously exposed by the apertures 42, while the two intermediate sections numbered 2 and 3 will not be in use at this time. Further, assuming that the sections numbered 1 and 4 are in use, one of these sections will cooperate with the right-hand lens system, while the other will cooperate with the left-hand lens system, so that one may produce what may be called a right-hand picture, while the other produces a left-hand picture. Also, it will be apparent that after this registry has been brought about by the manipulation of the usual spool feed operating member 4, the lens systems will remain in proper relation to the film sections in all positions of the lenses, i. e. irrespective of the distance of the camera from the object to be photographed or of the adjustment of the lens system control member 3.

With the small numerals appearing as indicated on the lower marginal edge of the film strip 36, it will be apparent that through rotation of the film feed operating member 4 until the small numerals 1, 2, 3, etc., successively appear in the sight aperture 39, it will be possible to use all of the sections of the film, two sections being used at a time, one a right-hand section and the other a left-hand section. In this use of the film, wherein the simultaneously exposed sections are indicated by the bracketed arrows at the bottom of Figure 9, the film is rotated through different distances at different times to prepare for the next picture, the film being wound until the next consecutive number appears in the aperture 39. If it is desired to feed the film the same distance each time, as, for example, with a mechanically driven film feed, it is possible to do this, the films then being exposed as indicated by the bracketed arrows at the top. However, in this operation, as shown in Figure 9, the film section 2 and the next to the last section, herein 11, will not be exposed.

In my improved construction, the casing 1 also has improved means for facilitating the insertion and removal of the films. Herein, these means include a rear door 53 hinged at its bottom 54 and provided with flanged edges 55 adapted tightly to close the back of the film spool chamber. Further, the top 22 of the casing 1 is provided with a pivoted cover portion 56 mounted on hinges 57 in rear of the adjusting member 3 and provided with flanged edges 58 adapted tightly to close the top of the casing and rest upon flanged supports 59 projecting out over the upper end of the rear door 53, suitable packing being provided to prevent the entry of light. The film feed operating member 4 being suitably journalled, as at 60, on the swinging cover 56, and this member 4 also being reciprocable through this cover and provided with connecting means 61 at its inner end adapted to be received in the usual turning apertures 62 in the upper end of one of the film spools 45, it will be evident that the film may be fed as desired when the casing is closed, while the latter may be readily opened when desired to permit removal or insertion of film. Note here also that spring latch connections 63, 64 are provided on the door 53 and the cover 56.

Here, of course, it will be understood that suitably synchronized shutter mechanisms are provided, as for example, ordinary cable released shutters, generally indicated at 65, and controlled by a common release member 66. The shutter mechanisms may, if desired, also be of any well-known type of focal plane shutter, such, for example, as used by Graflex. On the other hand, where slower operation is possible, ordinary lens shutters may be used. Further, it will be understood that I contemplate the use of any suitable viewer, such, for example, as an ordinary range finder 67, and the gearing of the same, as at 68, directly to a part 69 of the adjusting mechanism operative by the adjusting member 3. As both the particular shutter and range finder mechanisms per se do not form part of my present invention, the same have not been illustrated in detail.

In the operation of my improved construction, it will be apparent that the only adjustment of the mechanism necessary is that obtainable by the rotation of the controlling member 3 in accordance with the distance of the camera from the object to be photographed. All other adjustments of the mechanism are automatic, and such as to insure clean cut right and left pictures at all distances within the limits of the lens. Here attention is also directed to the fact that the reflectors 25 reverse the images in a horizontal plane so as to orient them properly on the film as regards the right and left sides. Thus, the second reversal of the image by the reflector, following the usual first reversal in the lens, causes the image to be formed on the film without requiring subsequent transposition of the negatives for printing. Accordingly, not only are the images properly oriented on the film as regards right and left, but it is made possible to use a continuous negative and to print the positives directly from this negative without transposition. Here also it will be understood that this same orientation is maintained during projection when using my camera as a projector, as shown in Figure 11, without need for transposition of the images. Thus, the images projected on the screen are kept in proper registry as regards right and left hand pictures, and the images thus formed are also in proper registry as regards right and left sides.

In my improved construction, it is possible to utilize the camera as a projector by merely withdrawing the block 48 and inserting a suitable projector unit 70 in place thereof. Herein, this unit 70 slides on the slides 51 and carries an idler film roll 49 and also a reflector 71, a suitable light source 72 being disposed at a suitable distance in rear of the rear door 53 and delivering on the reflector 71. Obviously, when such projector means are provided, the same reflector system is adapted to be used in projecting the pictures onto a screen, the reflector 71 then delivering light through the film to the reflectors 25 and from the latter through the lenses 2 or suitable projecting lenses, substituted therefor, to any suitable non-polarizing screen, suitable focus being obtained by adjustment of the member 3. Here, also, it will be understood that suitable polarizing filters 73 will then be provided for each of the lenses, these filters being so placed that one will plane polarize light vertically while the other will plane polarize it horizontally. It will, of course, also be understood that each person viewing the screen will be provided with suitable analyzing viewers correctly disposed relative to the filters, such, for example, as spectacles of Polaroid, so that each eye will see only the right or left hand picture which is supposed to be seen by that eye.

In Figure 13 is illustrated a modified form of mechanism for angularly adjusting the lenses 2 from the member 3 which may be used if desired in lieu of the worm and bevel gear drives heretofore described. In this construction, links 74 are connected to arms 75 on the members 8 and by an arm 76 to the shaft of the arm member 3.

While, for purposes of illustration, I have shown my invention as applied to a still camera, it will be understood that this form of the same is shown for purposes of illustration and that the same may be modified and used in other optical apparatus than cameras and other cameras than still cameras as, for example, in motion picture cameras, without departing from its spirit or the scope of the appended claims.

What I claim as new and desire to secure by Letters Patent is:

1. In an optical apparatus, adjustable stereoscopic lens systems including right and left lenses and means for adjusting said lenses into converging relation, image reflecting means cooperating with said lenses, and means for automatically adjusting the position of each of said reflecting means bodily and angularly relative to its lens as a function of lens convergence to eliminate distortion of the images as said lenses converge.

2. In an optical apparatus, adjustable stereoscopic lens systems including right and left lenses and means for adjusting said lenses into converging relation, image reflecting means cooperating with said lenses, and means automatically operated upon adjustment of said lenses for effecting both angular adjustment and translation of each of said reflecting means to change its position relative to its lens and maintain the images formed by said reflecting means free from distortion in different converging positions of said lenses.

3. In an optical apparatus, adjustable stereoscopic lens systems including right and left lenses and means for adjusting said lenses into converging relation, spaced reflecting means cooperating with said lenses, and means for automatically adjusting said spaced reflecting means angularly relative to said lenses and each reflecting means translatively away from and relative to its own lens to compensate for the displacement of images caused by converging said lenses.

4. In an optical apparatus, adjustable stereoscopic lens systems including right and left lenses and means for adjusting said lenses into converging relation, pivoted image reflecting means cooperating with different lenses, and means for automatically adjusting said reflecting means about their pivots and effecting a movement of translation of said pivots to compensate for the displacement of images caused by converging said lenses.

5. In an optical apparatus, adjustable stereoscopic lens systems including right and left lenses and means for adjusting said lenses into converging relation, image reflecting means cooperating with said lenses, and mechanism for automatically adjusting said reflecting means angularly and each of the same translatively to change its position relative to its lens as the convergence of said lenses is varied including means for maintaining the adjustment of lens convergence and the adjustment of said reflecting means functions of one another.

6. In an optical apparatus, adjustable stereoscopic lens systems including right and left lenses and means for adjusting said lenses into converging relation, image reflecting means cooperating with said lenses, and means for automatically adjusting said reflecting means angularly relative to said lenses and each bodily laterally to change its position relative to one another and to their respective lenses while the variation in focal length is maintained a function of the angle of lens convergence.

7. In an optical apparatus, adjustable stereoscopic lens systems including right and left lenses and means for adjusting said lenses into converging relation, spaced pivoted image reflecting means reflecting rays from said lenses in opposite directions, and means for automatically adjusting said reflecting means angularly about their pivots and adjusting their pivots toward one another while maintaining the angles of lens convergence and of the adjustment of said reflecting means functions of one another.

8. In a stereoscopic camera, adjustable stereoscopic lens systems including right and left lenses, means for adjusting said lenses into converging relation, adjustable image reflecting means cooperating with said lenses, sensitized means upon which said images are reflected, and means for automatically adjusting the position of each of said reflecting means angularly relative to its lens to eliminate distortion of the images as said lenses are adjusted to accord with the distances from the camera of the object to be photographed.

9. In a stereoscopic camera, adjustable stereoscopic lens systems including right and left lenses and means for adjusting said lenses into converging relation, image reflecting means cooperating with said lenses, sensitized means between said reflecting means upon which said images are reflected thereby, and means for automatically adjusting each of said reflecting means angularly relative to its lens upon converging of said lenses for maintaining central rays from the right and left lenses perpendicular to said sensitized means in all angular positions of said lenses.

10. In a stereoscopic camera, adjustale stereoscopic lens systems including right and left lenses and means for adjusting the same into converging relation, spaced image reflecting means cooperating with said lenses and angularly disposed relative thereto, sensitized means between said reflecting means, and means for adjusting each of said reflecting means both angularly and bodily laterally relative to its own lens upon converging said lenses to maintain the angles of adjustment of lens convergence and the adjustment of said reflecting means functions of one another.

11. In a stereoscopic camera, adjustable stereoscopic lens systems including right and left lenses and means for adjusting the same into converging relation, spaced reflecting means cooperating with said lenses, means for automatically adjusting each of said reflecting means angularly relative to its lens upon adjustment of said lenses to compensate for the displacement of images caused by converging said lenses, and means for presenting different parallel sensitized surfaces for simultaneous exposure between said spaced reflecting means in different converging relations of said lenses.

12. In a stereoscopic camera, adjustable stereoscopic lens systems including right and left lenses and means for adjusting said lenses into converging relation, image reflecting means cooperating with said lenses, mechanism for adjusting said reflecting means relative to said lenses including means for adjusting each reflecting means angularly and bodily relative to its lens for maintaining said images free from distortion in all converging relations of said lenses, and means including film guiding and feeding mechanism for successively exposing different parallel film sections between said reflecting means for taking simultaneous right and left hand pictures in different converging relations of said lenses.

13. In a stereoscopic camera, adjustable stereoscopic lens systems including right and left lenses and means for adjusting said lenses into converging relation, laterally spaced image reflecting means cooperating with said lenses, mechanism for automatically adjusting said reflecting means relative to said lenses including means for adjusting each reflecting means angularly and bodily relative to its lens to compensate for image displacement as said lenses are converged and maintain the central rays from both lenses transversely disposed in opposite directions in the camera and in coincidence in different converging relations of the lenses, and means for maintaining different sensitized sections perpendicular to the central rays reflected from different reflecting means in different converging relations of said lenses.

14. In a stereoscopic camera, adjustable stereoscopic lens systems including right and left lenses and means for adjusting said lenses into converging relation including a controlling member, image reflecting means cooperating with said lenses, and means controlled by said controlling member for simultaneously adjusting said reflecting means angularly relative to said lenses and each of said reflecting means angularly relative to its lens and laterally toward and away from one another to accord with the distance from the camera of the object to be photographed.

15. In a stereoscopic camera, adjustable stereoscopic lens systems including right and left lenses, viewer mechanism having a controlling member and means operated thereby for adjusting said lenses into converging relation, and means operated by said controlling member for simultaneously adjusting said reflecting means angularly relative to said lenses and each of said reflecting means angularly relative to its lens and laterally toward and away from one another to accord with the distance from the camera of the object to be photographed.

16. In a stereoscopic camera, matched stereoscopic right and left lenses pivoted on parallel vertical axes and having projections extending rearwardly from said lenses and angularly adjustable therewith, image reflecting means disposed angularly relative to said lenses and pivotally connected to said projections and movable bodily laterally therewith, and means controlling said pivoted reflecting means for adjusting the same angularly relative to said lenses and each of the same relative to its lens as the lenses are moved into and out of different converging relations.

17. In a stereoscopic camera, matched stereoscopic right and left lenses pivoted on laterally spaced axes and having projections extending rearwardly from said lenses and angularly adjustable therewith, image reflecting means cooperating with said lenses and angularly adjustable relative thereto and pivotally connected to said projections and movable laterally therewith, and means controlling said pivoted reflecting means for adjusting the same angularly relative to said lenses and each of the same relative to its lens as said lenses are moved into and out of different converging relations including cooperating stationary and movable guiding means for said reflecting means.

18. In a stereoscopic camera, a pivoted lens angularly movable about its pivot and having spaced rearwardly extending projections having longitudinal slotted rear ends, an image reflecting member having its opposite ends longitudinally reciprocable in the slotted ends of said projections, stationary means acting on portions movable with said reflecting means for adjusting the latter angularly relative to said projections as the latter move about the lens pivot, and means biasing said portions into engagement with said stationary means.

PAUL L. PHILLIPS.